US011182397B2

(12) United States Patent
Pollak

(10) Patent No.: US 11,182,397 B2
(45) Date of Patent: *Nov. 23, 2021

(54) AUTOMATED HIGHEST PRIORITY ORDERING OF CONTENT ITEMS STORED ON A DEVICE

(71) Applicant: TracFone Wireless, Inc., Miami, FL (US)

(72) Inventor: Frederick J. Pollak, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/430,751

(22) Filed: Jun. 4, 2019

(65) Prior Publication Data

US 2019/0286634 A1 Sep. 19, 2019

Related U.S. Application Data

(63) Continuation of application No. 14/600,652, filed on Jan. 20, 2015, now Pat. No. 10,311,064, which is a continuation of application No. 13/783,738, filed on Mar. 4, 2013, now Pat. No. 8,938,460.

(51) Int. Cl.
| | |
|---|---|
| *G06F 16/00* | (2019.01) |
| *G06F 16/2457* | (2019.01) |
| *G06F 16/35* | (2019.01) |
| *G06F 16/432* | (2019.01) |
| *G06F 16/44* | (2019.01) |

(52) U.S. Cl.
CPC ........ *G06F 16/24578* (2019.01); *G06F 16/35* (2019.01); *G06F 16/434* (2019.01); *G06F 16/44* (2019.01); *Y10S 707/915* (2013.01)

(58) Field of Classification Search
CPC .... G06F 16/24578; G06F 16/44; G06F 16/35; G06F 16/434; G06F 16/9035; G06F 16/31; G06F 16/901; G06F 16/951; G06F 17/00; G06F 17/30; G06F 40/30; G06F 40/106; G06F 40/131; G06F 40/137; G06F 40/166; G06F 40/186; Y10S 707/915; G06G 16/00
See application file for complete search history.

(56) References Cited

U.S. PATENT DOCUMENTS

| | | | | |
|---|---|---|---|---|
| 7,158,176 | B2 * | 1/2007 | Tokkonen | G06F 12/121 348/207.11 |
| 7,562,056 | B2 | 7/2009 | Ma et al. | |
| 7,788,267 | B2 | 8/2010 | Wolas-Shiva et al. | |
| 7,849,116 | B2 * | 12/2010 | Jacobs | H04L 67/306 707/767 |
| 9,154,826 | B2 * | 10/2015 | Raleigh | H04N 21/812 |
| 9,210,217 | B2 * | 12/2015 | Raleigh | H04L 67/26 |
| 9,338,233 | B2 * | 5/2016 | Raleigh | H04W 4/50 |
| 2005/0271352 | A1 | 12/2005 | Yokouchi | |
| 2006/0004698 | A1 * | 1/2006 | Pyhalammi | G06F 16/44 |
| 2007/0177805 | A1 | 8/2007 | Gallagher | |

(Continued)

*Primary Examiner* — Jean M Corrielus
(74) *Attorney, Agent, or Firm* — BakerHostetler

(57) ABSTRACT

A method and device relate to prioritizing content items stored on a device and, more particularly, relate to automatically ordering highest priority content items stored on a device according to multiple criteria. The method and device enabling presentation, on a display of the device, the high priority content items in order of their total priority.

20 Claims, 6 Drawing Sheets

(56) References Cited

U.S. PATENT DOCUMENTS

| | | | | |
|---|---|---|---|---|
| 2008/0205789 A1* | 8/2008 | Ten Kate | ............... | G06T 11/60 |
| | | | | 382/284 |
| 2010/0011077 A1* | 1/2010 | Shkolnikov | ........... | H04L 51/063 |
| | | | | 709/206 |
| 2010/0073519 A1* | 3/2010 | Onoe | ....................... | G06T 7/33 |
| | | | | 348/231.99 |
| 2010/0088297 A1* | 4/2010 | Kiilerich | .............. | H04L 67/1095 |
| | | | | 707/705 |
| 2011/0002543 A1* | 1/2011 | Herraiz | ................. | G06Q 30/02 |
| | | | | 382/190 |
| 2011/0029553 A1* | 2/2011 | Bogart | ................... | G06F 16/58 |
| | | | | 707/769 |
| 2011/0029988 A1* | 2/2011 | Mittal | ...................... | G06F 9/54 |
| | | | | 719/314 |
| 2011/0310039 A1 | 12/2011 | Kim | | |
| 2012/0026193 A1 | 2/2012 | Higeta | | |
| 2012/0030325 A1* | 2/2012 | Silverman | ............... | H04L 67/28 |
| | | | | 709/222 |
| 2012/0130954 A1* | 5/2012 | Hood | .................... | G06Q 10/10 |
| | | | | 707/640 |
| 2012/0148158 A1 | 6/2012 | DeSpain | | |
| 2012/0203796 A1* | 8/2012 | Abraham | ................ | H04W 4/02 |
| | | | | 707/770 |
| 2012/0324357 A1* | 12/2012 | Viegers | ................. | G06F 3/0481 |
| | | | | 715/730 |
| 2013/0305144 A1* | 11/2013 | Jackson | ................ | G06F 40/114 |
| | | | | 715/246 |
| 2013/0305145 A1* | 11/2013 | Jackson | ................ | G06F 40/103 |
| | | | | 715/246 |
| 2015/0269160 A1* | 9/2015 | Babaian | ................ | G06F 16/951 |
| | | | | 707/751 |
| 2017/0223131 A1* | 8/2017 | Raleigh | ............... | H04L 67/2809 |
| 2020/0081895 A1* | 3/2020 | Babaian | ................ | G06F 16/951 |

\* cited by examiner

| Data Type | Data |
|---|---|
| Manufacturer | Samsung |
| Model | Galaxy |
| Orientation | Portrait |
| Date and Time | 2003:08:11 16:45:32 |
| GPS Position | 57.64911 10.40744 |
| Compression | JPEG |
| x-Resolution | 72.00 |
| y-Resolution | 72.00 |
| Resolution Unit | Inch |
| PixelXDimension | 2240 |
| PixelYDimension | 1680 |
| Exposure Time | 1/659 sec. |
| Flash | No |
| Color Space | sRGB |

AUTOMATED HIGHEST PRIORITY ORDERING OF CONTENT ITEMS STORED ON A DEVICE

CROSS REFERENCE TO PRIOR APPLICATIONS

This application is a continuation of U.S. patent application Ser. No. 14/600,652, filed Jan. 20, 2015, now U.S. Pat. No. 10,311,064 issued Jun. 4, 2019, which is a continuation of U.S. patent application Ser. No. 13/783,738, filed Mar. 4, 2013, now U.S. Pat. No. 8,938,460 issued Jan. 20, 2015, both of which are incorporated herein by reference in their entirety.

TECHNICAL FIELD

The disclosure generally relates to prioritizing content items stored on a device and, more particularly, relates to automatically ordering highest priority content items stored on a device according to multiple criteria.

BACKGROUND

As the capabilities and storage of multifunctional cellular or mobile phones have increased, the information stored on these phones has also increased. For example, many current mobile phones can capture content, such as audio, pictures, and video. In addition, a user can download or receive content from other users or from other content providers, such as websites or media library applications. As such, a mobile phone typically stores hundreds to thousands of content items in its memory. For example, a user may store thousands of pictures on his/her mobile phone.

Currently, to find a particular content item, such as a particular photograph, a user must select a folder or album that contains the photograph. The order of the photographs in the folder or album is typically chronological, so the user is required to browse through the photographs to locate a particular photograph, which is both time-consuming and tedious.

To quickly access particular content items, users typically assign or move a content item to a specific folder or album. However, grouping content items requires that the user create a folder or album and manually select each content item for inclusion in that folder or album. Such manual selection must be repeated for each new item that the user would like to assign, which is also time-consuming and tedious.

Therefore, to improve the user experience in locating a particular content item stored on a device, automatically ordering content items stored on the device according to multiple criteria is needed.

SUMMARY

In one aspect of the invention, a method for automatically ordering high priority content items stored on a device includes identifying two or more content items locally stored on a device, determining a first priority metric for each of the two or more content items, the first priority metric being a number of times that a user of the device accesses each of the two or more content items, determining a second priority metric for each of the two or more content items, the second priority metric being different from the first priority metric, multiplying the first priority metric by a first weight to calculate a first priority score for each of the two or more content items, multiplying the second priority metric by a second weight to calculate a second priority score for each of the two or more content items, the second weight being different from the first weight, summing the first priority score and the second priority score to calculate a total priority score for each of the two or more content items, comparing the total priority score for each of the two or more content items to a predetermined threshold to identify high priority content items within the two or more content items, and enabling presentation, on a display of the device, of identifiers of the high priority content items in order of their total priority scores.

In another aspect of the invention, a device includes at least one processor connected to at least one memory, wherein the at least one processor is configured to identify two or more content items locally stored on a device, determine a first priority metric for each of the two or more content items, the first priority metric being a number of times that a user of the device accesses each of the two or more content items, determine a second priority metric for each of the two or more content items, the second priority metric being different from the first priority metric, multiply the first priority metric by a first weight to calculate a first priority score for each of the two or more content items, multiply the second priority metric by a second weight to calculate a second priority score for each of the two or more content items, the second weight being different from the first weight, sum the first priority score and the second priority score to calculate a total priority score for each of the two or more content items, compare the total priority score for each of the two or more content items to a predetermined threshold to identify high priority content items within the two or more content items, and enable presentation, on a display of the device, of identifiers of the high priority content items in order of their total priority score.

In yet another aspect of the invention, a non-transitory computer readable medium storing a computer program, the computer program includes one or more code segments that, when executed, cause at least one processor to identify two or more content items locally stored on a device, determine a first priority metric for each of the two or more content items, the first priority metric being a number of times that a user of the device accesses each of the two or more content items, determine a second priority metric for each of the two or more content items, the second priority metric being different from the first priority metric, multiply the first priority metric by a first weight to calculate a first priority score for each of the two or more content items, multiply the second priority metric by a second weight to calculate a second priority score for each of the two or more content items, the second weight being different from the first weight, sum the first priority score and the second priority score to calculate a total priority score for each of the two or more content items, compare the total priority score for each of the two or more content items to a predetermined threshold to identify high priority content items within the two or more content items, and enable presentation, on a display of the device, of identifiers of the high priority content items in order of their total priority score. Details of one or more implementations of automatically ordering highest priority content items stored on a device according to multiple criteria are set forth in the accompanying drawings and the description below. Other aspects of automatically ordering highest priority content items stored on the device according to multiple criteria will be apparent from the description and drawings, and from the claims.

DESCRIPTION OF DRAWINGS

Like reference symbols indicate like elements throughout the specification and drawings.

DETAILED DESCRIPTION

Figure 1:
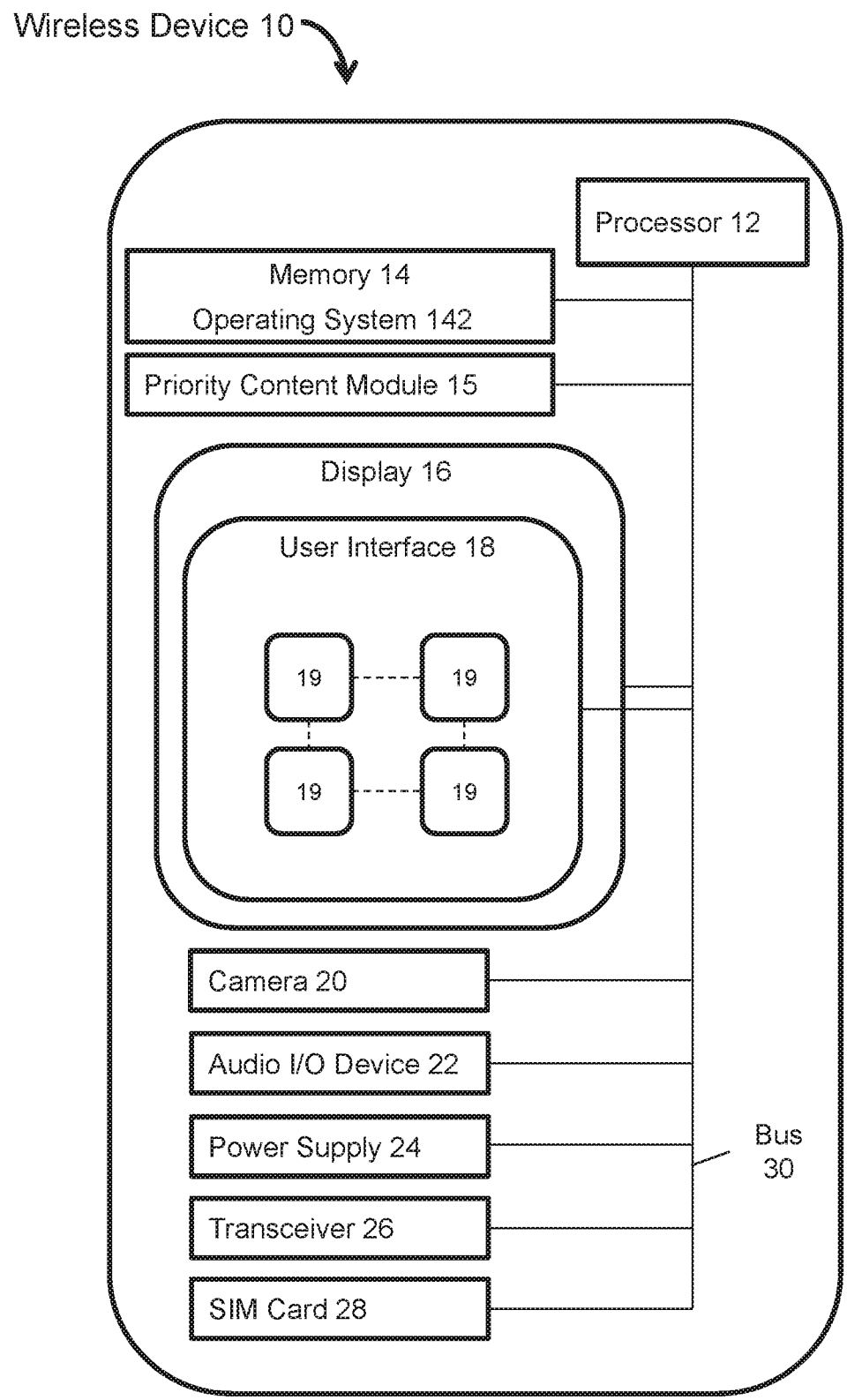
FIG. 1 illustrates a block diagram of an exemplary wireless device.

FIG. 1 illustrates a block diagram of an exemplary wireless device 10. The wireless device 10 can be any mobile technology computing device that connects to a wireless communication network such as, for example, a mobile phone, a smart phone, a wireless handset, a wireless dongle, user equipment, a mobile station, or the like. The wireless communication network can be any type of wireless network, such as a cellular data network, e.g., a Global System for Mobile Communication ("GSM") network, a Code-Division Multiple Access ("CDMA") network, a Universal Mobile Telecommunications System ("UMTS") network, an Evolution-Data Optimized ("EV-DO") network, a long-term evolution ("LTE") network, a wireless local network, a wide area network, or the like.

The wireless device 10 includes one or more processors 12, one or more memories 14, a priority content module 15, a display 16, a user interface 18, a camera 20, one or more audio input/output devices 22, a power supply 24, a transceiver 26, and may include a Universal Integrated Circuit Card ("UICC") or Subscriber Identity Module ("SIM") card 28. The wireless device 10 may also include an antenna (not shown) coupled to the transceiver 26 to facilitate the transmission and reception of communications by the wireless device 10. The components 12-28 within the wireless device 10 may communicate through an internal bus 30.

In some implementations, the SIM card 28 can be removably received within a card slot (not shown) in the wireless device 10 and can include internal SIM memory. The SIM card 28 can store identification information such as an International Mobile Subscriber Identity ("IMSI"), an Integrated Circuit Card Identification ("ICCID"), Electronic Serial Number ("ESN"), International Mobile Equipment Identity ("IMEI"), International Mobile Subscriber Identity ("IMSI"), Local Area Identity ("LAI"), and/or the like. The SIM card 28 can be configured to be transferred between different wireless devices 10. In other implementations, the wireless device 10 can operate without a UICC or SIM card 28.

The one or more processors 12 are capable of processing instructions for execution within the wireless device 10. For example, the one or more processors 12 can process instructions stored in the one or more memories 14 to display graphical information on the display 16 and/or to transmit or receive data using the transceiver 26. In some implementations, the one or more processors 12 can process instructions to automatically order highest priority content items stored on the wireless device 10 according to multiple criteria. In addition, the one or more processors 12 may be configured to process voice call functions, messaging functions, data transfer, and other wireless services. The one or more processors 12 can be single-threaded processors or multi-threaded processors. The one or more memories 14 can include, for example, volatile or non-volatile random access memory ("RAM"), read only memory ("ROM") and/or the like.

The one or more memories 14 can store, at least, an operating system 142. The operating system 142 manages operations of the wireless device 10 and includes at least a hardware interface module that provides an interface to components 12-30, a file system that manages files such as two or more content items, and a process control module that manages processes executing on wireless device 10.

The priority content module 15 can perform the function of automatically ordering highest priority content items stored on the wireless device 10 according to multiple criteria, as explained in greater detail below with reference to FIG. 2. The priority content module 15 may be pre-installed or post-installed on the wireless device 10 and can be updated over time using Over The Air ("OTA") programming or non-OTA programming. The priority content module 15 may be stored or executed on, for example, the one or more memories 14, the SIM card 28, dedicated hardware, application specific integrated circuits, programmable logic arrays, and/or the one or more processors 12 of the wireless device 10. The instructions for the priority content module 15 may be included in hardware of the wireless device 10 or in an application stored in the one or more memories 14 of the wireless device 10 and run by the operating system 142 of the wireless device 10. The processes, features, and/or functions of the priority content module 15 may be performed with or without human interaction or augmentation.

The display 16 may be a screen that can be touch sensitive and can include a user interface 18, such as a graphical user interface, that has selectable regions. The selectable regions can be, for example, icons 19 associated with different applications and/or content items, buttons for selecting alphanumeric characters, buttons for making selections, selectable thumbnails, selectable lists, selectable links, interactive widgets, or the like. The display 16 can detect the presence and location of a touch within its display area. For example, touching one of the icons 19 displayed on the display 16 with a finger or passive object, such as a stylus, will execute an application associated with the icon 19. The display 16 can be a capacitive touchscreen, a resistive touchscreen, a surface acoustic wave touchscreen, a surface capacitance touchscreen, a projected capacitive touchscreen, or the like.

The camera 20 can include one or more cameras to provide visual input. The wireless device 10 can include, for example, one camera 20 on the back side of the wireless device 10 and another camera 20 on the front side of the wireless device 10. In some implementations, the front camera can primarily be used for video chatting, whereas the back camera can be primarily used for capturing photographs. As such, the resolutions of the front and back cameras can differ such that, for example, the back camera can have a higher resolution than the front camera. The camera 20 can also capture video in combination with a microphone of the audio input/output device 22.

The audio input/output device 22 may include one or more speakers, speaker outputs, or the like to provide audio output, and may include one or more microphones, microphone inputs, or the like to provide audio input. The audio input/output device 22 may include analog-to-digital converters and digital-to-analog converters for audio input and output functions, respectively.

Figure 2:
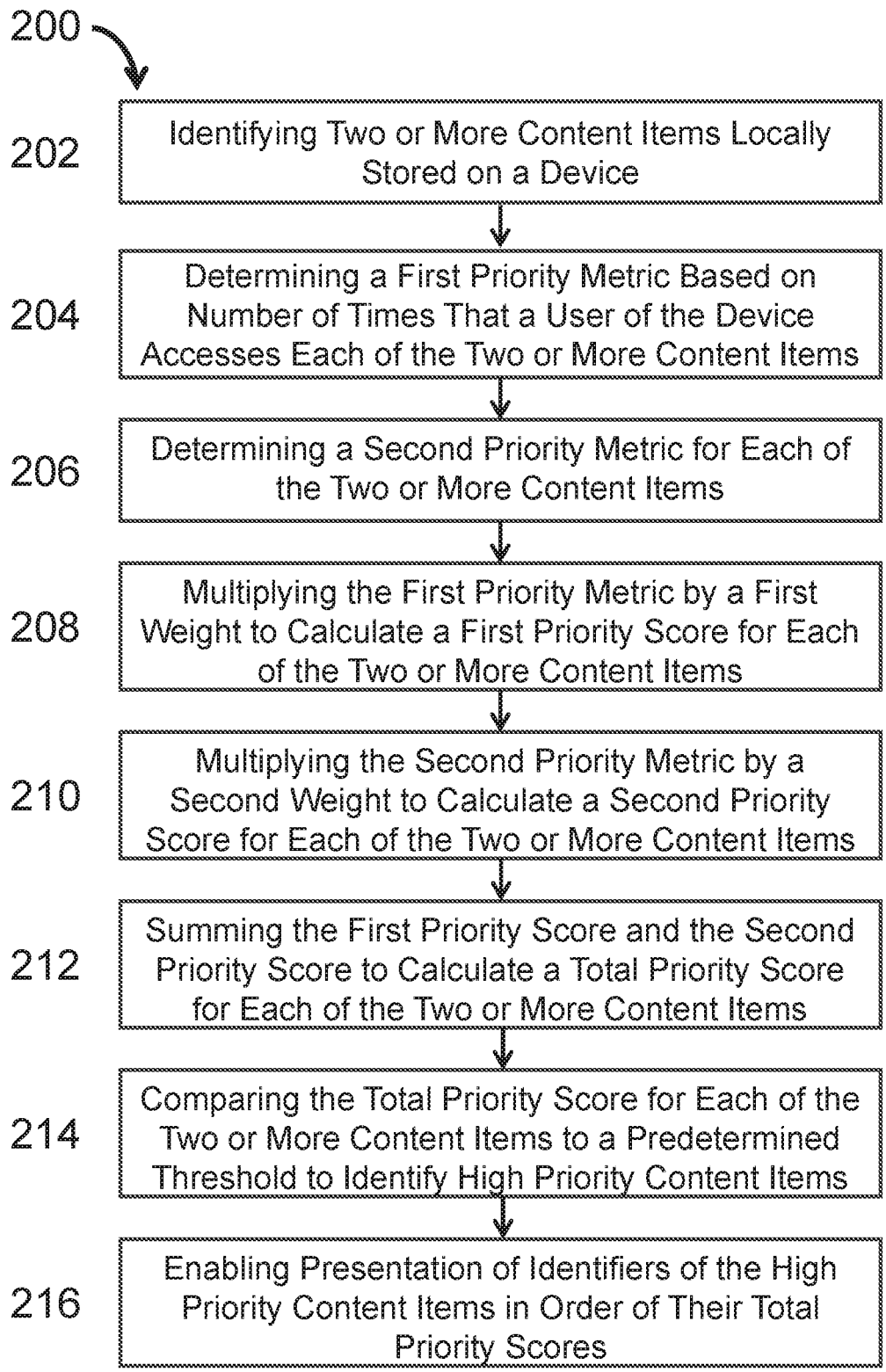
FIG. 2 illustrates a flowchart showing an exemplary process for automatically ordering highest priority content items stored on a wireless device according to multiple criteria.

FIG. 2 illustrates a flowchart showing an exemplary process 200 for automatically ordering highest priority content items stored on the wireless device 10 according to multiple criteria. One or more steps in the process 200 can be carried out by, for example, the priority content module 15.

Initially, two or more content items locally stored on the wireless device 10 are identified (step 202). The two or more content items can be all of the content items locally stored on the wireless device 10 or a subset of all of the content items locally stored on the wireless device 10. In some implementations, for example, the two or more content items can be content items of a particular type, such as an image, content items stored on a particular date or date range, content items from a particular source, such as a back camera or transferred through short-wavelength radio transmissions, content items including a particular attribute, such as including a face, or the like. The two or more content items are locally stored on the wireless device 10 such that they are stored in the one or more memories 14 of the wireless device 10.

In some implementations, the two or more content items can be any type of content items such as, for example, images such as pictures and photographs, videos such as video clips and movies, audio files such as microphone recordings, music, and the like. The two or more content items can be of the same type of content item or of different types of content items. For example, in some implementations, the two or more content items can be multiple photographs, while in other implementations, the two or more content items can be a photograph and a movie.

Next, the number of times that a user of the wireless device 10 accesses each of the two or more content items is determined (step 204). The number of times that the user of the wireless device 10 accesses each of the two or more content items is a first priority metric that is stored by the priority content module 15. In some implementations, the priority content module 15 can include an access count for each of the two or more content items that is incremented by one for each access by the user. An access can be defined as an instance where a content item is called by the operating system 142 of the wireless device 10. For example, if a user opens a content item, moves a content item to another folder or location in one or more memories 14, sends the content item by email, messaging, chat, or short-wavelength radio transmission, or the like, the access count for the content item will be incremented.

In some implementations, the number of times that a user of the wireless device 10 accesses each of the two or more content items can be stored from the time each of the two or more content items is locally stored on wireless device 10. In other implementations, the number of times that a user of the wireless device 10 accesses each of the two or more content items can be stored for predetermined time periods and/or from predetermined dates. For example, the number of times that a user of the wireless device 10 accesses each of the two or more content items can be stored for the prior week, month, quarter, and year, or from a predetermined event, such as a system update or installation of a new software application.

A second priority metric for each of the two or more content items is also determined (step 206). The second priority metric can be a metric measuring an access characteristic of each of the two or more content items by the user, a metric determined based on metadata included in each of the two or more content items, and/or a metric determined based on analysis of the data of each of the two or more content items. The second priority metric can be stored by the priority content module 15.

In particular, the second priority metric can be a metric measuring the access characteristic of each of the two or more content items by the user of the wireless device 10 by, for example, measuring the total access time of each content item, determining the type of manipulation of each access of each content item, determining the type of transfer of each content item, or the like.

The total access time of each content item can be the total time that the user of the wireless device 10 has interacted with the content item, such as the total time that the content item has been displayed on the display 16 of the wireless device 10. In some implementations, the access time itself can be the second priority metric, while in other implementations, each second of access time can be assigned a value, the sum of which can be the second priority metric. In some implementations, the values assigned to each second of access time can differ in different periods of time such that, for example, each second of access time under a first time is assigned a first value, each second of access time between the first time and a second time is assigned a second, higher value, and each second of access time greater than the second time is assigned a third, highest value. As such, the second metric for content items that are accessed for relatively long periods of time would be nonlinearly greater than those accessed for relatively short periods of time.

The type of manipulation of each access of each content item can be determined and assigned a predetermined value. In some implementations, for example, a first type of manipulation can be assigned a first value and a second type of manipulation can be assigned the same or a second, different value. The types of manipulations can be, for example, zooming of a content item, editing a content item, filtering a content item, or the like.

In some implementations, for example, zooming of a photograph may be assigned a first value and filtering a photograph using a photo filter may be assigned a second, higher value if it is known that filtered photographs are typically of more interest. Following each manipulation of the content item, the value assigned to the type of manipulation is added to the second priority metric for that content item.

The type of transfer of each content item can be determined and assigned a predetermined value. In some implementations, for example, a first type of transfer can be assigned a first value and a second type of transfer can be assigned the same value or a second, different value. The types of transfers can be, for example, attachment to an email, transfer by Multimedia Messaging Service ("MMS"), upload to a chat, or transfer by short-wavelength radio transmission, or the like. In some implementations, for example, transferring a photograph by attaching it to an email may be assigned a first value and transferring a photograph by short-wavelength radio transmission may be assigned a second, higher value if it is known that photographs transferred to people within a close vicinity of the wireless device 10 are typically of more interest. Following each transfer of the content item, the value assigned to the type of transfer is added to the second priority metric for that content item.

Figure 3:
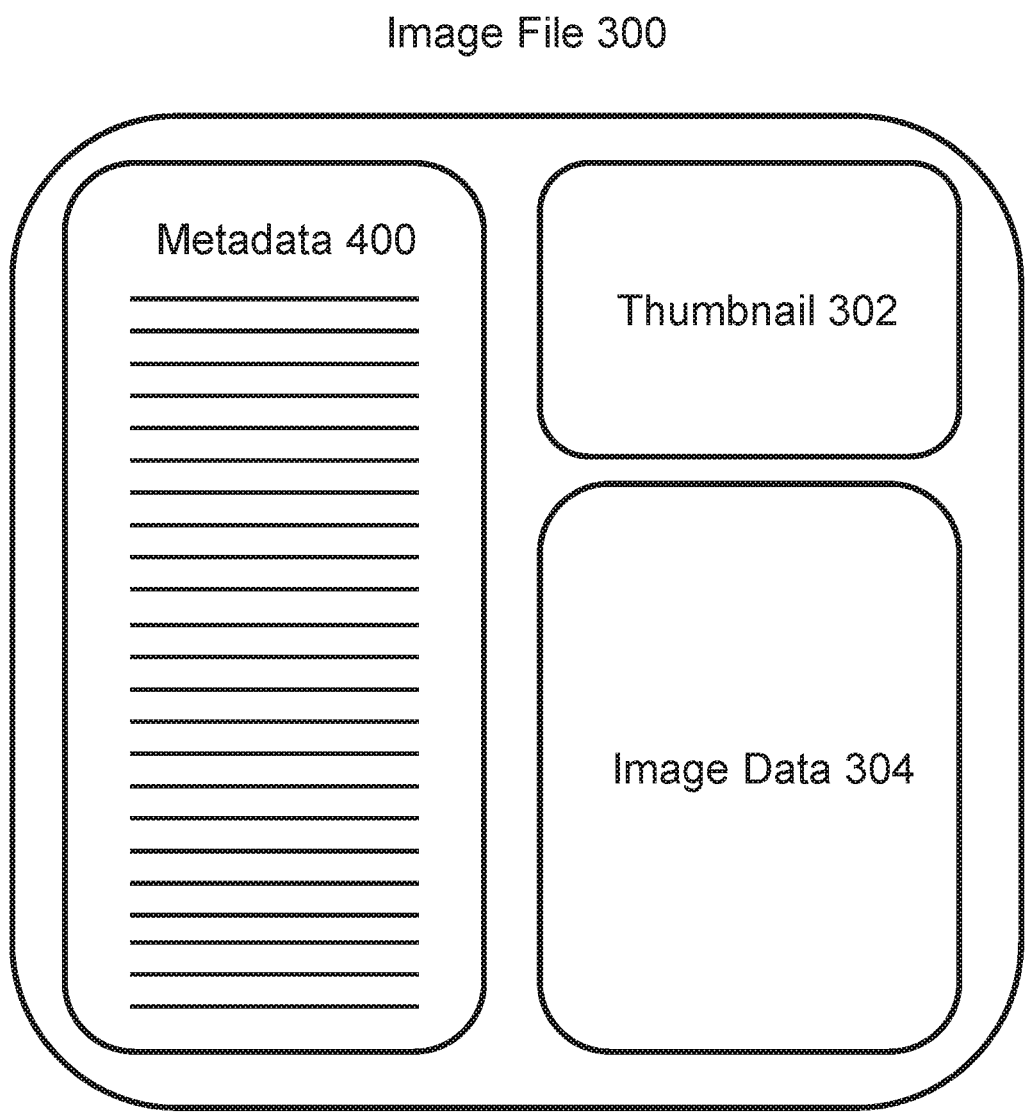
FIG. 3 illustrates an exemplary image file structure.

The second priority metric can be a metric determined based on metadata included in each of the two or more content items. Content items can include at least metadata and data. For example, FIG. 3 illustrates an exemplary image file structure 300. The image file structure 300 includes metadata 400, a thumbnail 302, and image data 304. The metadata 400 includes information regarding the image data 304 of an image file and is not included in the image data 304, as explained in greater detail with regard to FIG. 4. The thumbnail 302 is a reduced-size version of the image stored in the image data 304. In some implementations, the thumbnail 302 may not be included in the image file structure 300. The image data 304 is data that is displayed on the display 16 of the wireless device 10.

Figure 4:
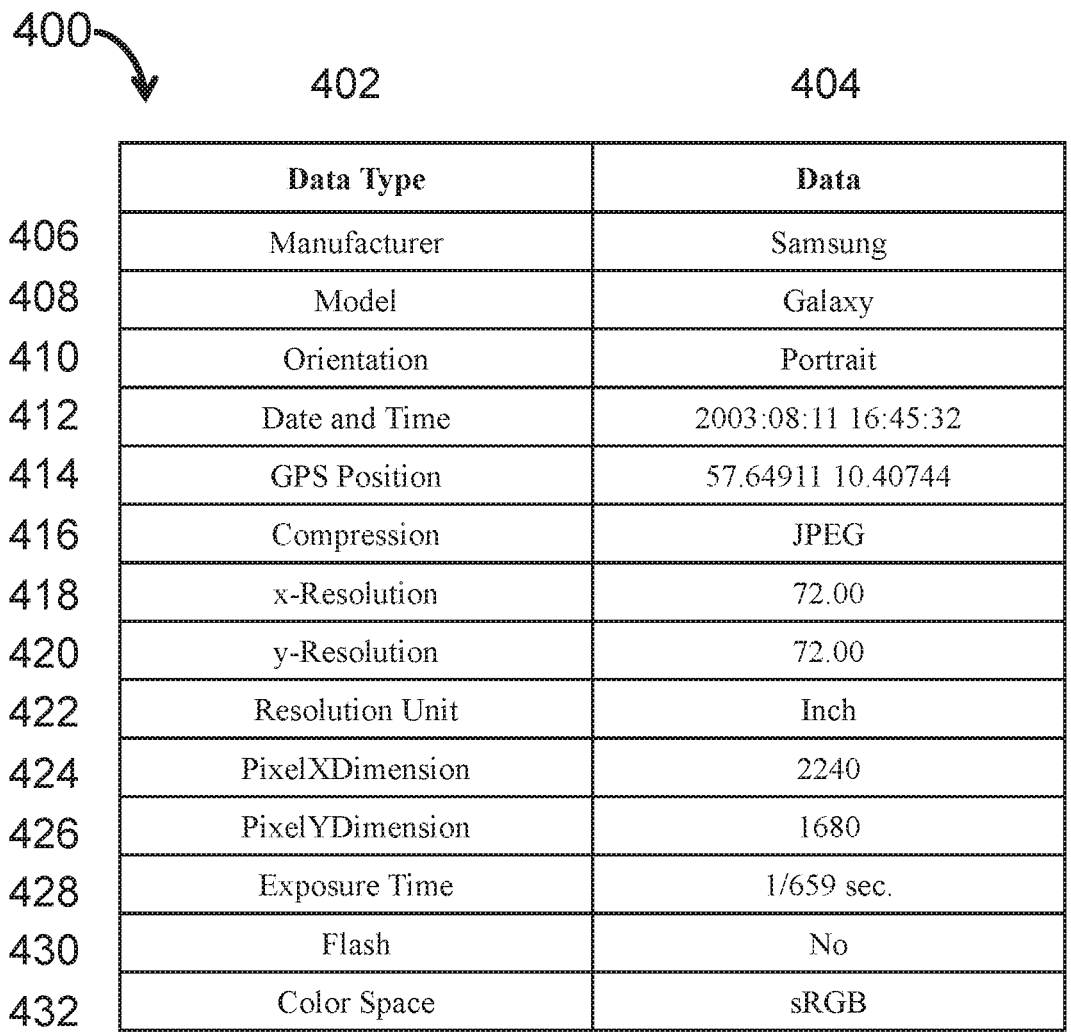
FIG. 4 illustrates an exemplary image file metadata structure.

FIG. 4 illustrates an exemplary image file metadata structure 400. The metadata structure 400 includes a data type field 402 and a data field 404. One or more of the entries 406-432 can be accessed by the priority content module 15. The data types 402 stored in the metadata 400 of an image file 300 include the manufacturer 406 of the wireless device 10 used to capture the image, the model 408 of the wireless device 10 used to capture the image, the orientation 410 of the image, the date and time 412 of image capture, the Global Positioning System ("GPS") position 414 of image capture, the type of compression 416 of the image, the horizontal resolution 418 in pixels per unit, the vertical resolution 420 in pixels per unit, the unit of resolution 422, the number of horizontal pixels 424, the number of vertical pixels 426, the exposure time 428 of image capture, whether a flash 430 was used in image capture, and the color space 432 of image capture.

The second priority metric can be based on the data in field 404 of one or more of the entries 406-432. For example, the second priority metric can be based on the orientation of a photograph determined by data in entry 410. In particular, a first priority value can be assigned to portrait photographs and a second, higher priority value can be assigned to landscape photographs if it is known that photographs in landscape orientation are typically of more interest.

In another example, the second priority metric can be based on the resolution of a photograph. In some implementations, the resolution value itself determined by data in entry 418 and/or entry 420 can be the second priority metric, while in other implementations, ranges of resolution values can each be assigned to increasing priority values. For example, relatively low resolution photographs, e.g., below 150 pixels per inch ("PPI"), can be assigned a first value, relatively medium resolution photographs, e.g., between 150 PPI and 300 PPI, can be assigned a second, higher value, and relatively high resolution photographs, e.g., above 300 PPI, can be assigned a third, highest value. As such, photographs captured with a back camera 20 of the wireless device 10 that have a higher resolution than photographs captured with a front camera 20 will be assigned a higher second priority metric if it is known that photographs with a higher resolution are typically of more interest.

In yet another example, the second priority metric can be based on the date and time of image capture determined by data in entry 412. Different priority values can be assigned to various date and time ranges. For example, photos captured during business hours can be assigned a first value and photos captured outside of business hours can be assigned a second, higher value if it is known that photographs captured in the evenings or nights are typically of more interest. In another example, photos captured in the middle of the week can be assigned a first value and photos captured on the weekends can be assigned a second, higher value if it is known that photographs captured on the weekend are typically of more interest. In yet another example, photos captured on days that are not holidays can be assigned a first value and photos captured on holidays can be assigned a second, higher value if it is known that photographs captured on holidays are typically of more interest.

In still another example, the second priority metric can be based on the GPS position of image capture determined by data in entry 414. Different priority values can be assigned to various geographical areas. For example, photos captured outside of large cities can be assigned a first value and photos captured in large cities can be assigned a second, higher value if it is known that photographs captured in large cities are typically of more interest. In another example, photos captured within a predetermined radius of the user's home address can be assigned a first value and photos captured outside of that radius can be assigned a second, higher value if it is known that photographs captured on trips are typically of more interest.

The second priority metric can be a metric determined based on analysis of the data of each of the two or more content items. The analysis of the data of each of the two or more content items can be the number of faces in a photograph, whether a person of interest is included in the photograph, facial expressions, whether the photograph is in focus, the brightness of the picture, the most frequent color or color histogram of the photograph, or the like.

The number of faces in a photograph can be automatically determined by a facial detection algorithm or with the user identifying the faces. In some implementations, the number of faces itself can be the second priority metric, while in other implementations, priority values can be assigned based on the number of faces. For example, photographs having a relatively few number of faces, e.g., below 5 faces, can be assigned a first value and photographs having a relatively high number of faces, e.g., greater than 5, can be assigned a second, higher value if it is known that photographs of gatherings are typically of more interest.

Similarly, photographs including a person of interest, such as the user of the wireless device 10, can be assigned a higher value than those that do not include the person of interest if it is known that photographs of certain people are typically of more interest. The people in a photograph can be automatically determined using a facial recognition algorithm or with the user identifying the people in the photograph.

Likewise, photographs including a person with a particular facial expression (e.g., smiling, happy, laughing, and/or the like), can be assigned a higher value than those that do not include the particular facial expression if it is known that photographs of certain facial expressions are typically of more interest. The facial expressions in a photograph can be automatically determined using a facial recognition algorithm.

An algorithm can be run on each content item to determine whether it is in focus and content items that are in focus can be assigned a higher priority value than those that are not in focus if it is known that in focus photographs of are typically of more interest.

The brightness of the content item can be automatically determined from the content item. In some implementations, the brightness magnitude itself can be the second priority metric, while in other implementations, priority values can be assigned based on the brightness magnitudes. For example, dark photographs, i.e., photographs having a brightness magnitude below a threshold, can be assigned a first value and bright photographs, i.e., photographs having a brightness magnitude above a threshold, can be assigned a second, higher value if it is known that brighter photographs are typically of more interest.

The most frequent color or color histogram of the content item can also be used to determine a second priority metric. For example, priority values can be assigned based on the prominent color of the photographs. In particular, photographs having mostly blue colored pixels, such as photographs including the sky, can be assigned a first value and photographs having mostly green colored pixels, such as photographs including trees, can be assigned a second, higher value if it is known that photographs with trees are typically of more interest to the user.

Similar to the first priority metric of the number of times that the user accesses each of the two or more content items, in some implementations, the second priority metric can be stored from the time each of the two or more content items are locally stored on wireless device 10, while in other implementations, the second priority metric can be stored for predetermined time periods or from predetermined dates.

Moreover, in some implementations, three or more priority metrics can be determined for each of the two or more content items and used to calculate the total priority score for each of the two or more content items. The third priority metric and other priority metrics can be one or more of a metric measuring an access characteristic of each of the two or more content items by the user, a metric determined based on metadata included in each of the two or more content items, and a metric determined based on analysis of the data of each of the two or more content items, as described above with reference to the second priority metric. Preferably, the third and other priority metrics are different from the second priority metric and from one another to increase the likelihood that high priority content items are identified.

Referring again to FIG. 2, the first priority metric is multiplied by a first weight to calculate a first priority score for each of the two or more content items (step 208). The first weight can be any number and, preferably, is a fraction between zero and one. In some implementations, the first weight can be predefined in the priority content module 15 and constant over time. In other implementations, the first weight can initially be predefined in the priority content module 15 but change over time. For example, the first weight can be manually updated by the user of the wireless device 10 or an operator of the priority content module 15. In another example, the first weight can automatically update without user augmentation or interaction through learning, artificial intelligence, or the like. In particular, the priority content module 15 may collect information regarding numerous interactions with the user and the two or more content items. For example, if the priority content module 15 determines over time that the user is not typically interested in photographs that are frequently accessed, then the value of the first weight can be reduced.

Similarly, the second priority metric is multiplied by a second weight to calculate a second priority score for each of the two or more content items (step 210). The second weight can also be any number and, preferably, is a fraction between zero and one. In some implementations, the second weight can be predefined in the priority content module 15 and constant over time. In other implementations, the second weight can initially be predefined in the priority content module 15 but change over time. For example, the second weight can be manually updated by the user of the wireless device 10 or an operator of the priority content module 15. In another example, the second weight can automatically update without user augmentation or interaction through learning, artificial intelligence, or the like. In particular, if the second priority metric is based on the photograph resolution and the priority content module 15 determines over time that the resolution of photographs is not correlated with user interest in the photographs, then the value of the second weight can be reduced.

Similarly, if other priority metrics are also used to identify high priority content items, each of those priority metrics can also be multiplied by a corresponding weight according to the description above.

Next, the first priority score and the second priority score are summed to calculate a total priority score for each of the two or more content items (step 212). The total priority score is indicative of the probability that the user is interested in the content item.

The total priority score for each of the two or more content items is then compared to a predetermined threshold to identify high priority content items (step 214). The predetermined threshold can be any number. In some implementations, the predetermined threshold can be predefined in the priority content module 15 and constant over time. In other implementations, the predetermined threshold can initially be predefined in the priority content module 15 but change over time. For example, the predetermined threshold can be manually updated by the user of the wireless device 10 or an operator of the priority content module 15. In another example, the predetermined threshold can automatically update without user augmentation or interaction through learning, artificial intelligence, or the like. In particular, if the initial predetermined threshold is, for example, ten and the priority content module 15 determines over time that content items having a total priority score of less than twenty are not of interest to the user, i.e., the user does not typically access content items having a total priority score of less than twenty, then the value of the predetermined threshold can be changed to twenty.

In some implementations, the identified high priority content items can be grouped into a predetermined folder, such as a high priority folder. In other implementations, a list with identifiers, such as file names, of the identified high priority content items can be stored by the priority content module 15. In yet other implementations, the identified high priority content items can be marked and/or signified by an indicator. For example, the metadata 400 of the image file 300 can include a flag bit that signifies whether the image file 300 is a high priority content item.

Finally, identifiers of the high priority content items are enabled for presentation on the display 16 of the wireless device 10 in the order of their total priority scores. The identifiers of the high priority content items can be displayed in response to selection of a high priority content item folder by the user. The user can touch an icon associated with the high priority content item folder on a homepage displayed on the display 16 to select the high priority content item folder.

The identifiers of the high priority content items can be file names, thumbnails 302, other images associated with the high priority content items such as album art, a selection of the data of the high priority content items such as a short sample of a song, information included in the metadata 400 of the content item, or the like. Preferably, the identifiers of the identified high priority content items are ordered for display according to their respective total priority scores, such that the identifier of the content item that has the highest total priority score and is most likely to be of interest to the user is displayed before the other high priority content items. The priority content module 15 enables the identifiers of the high priority content items for presentation by preparing graphical user interfaces for the operating system 142, which coordinates the display of the graphical user interfaces on the display 16.

Figure 5A:
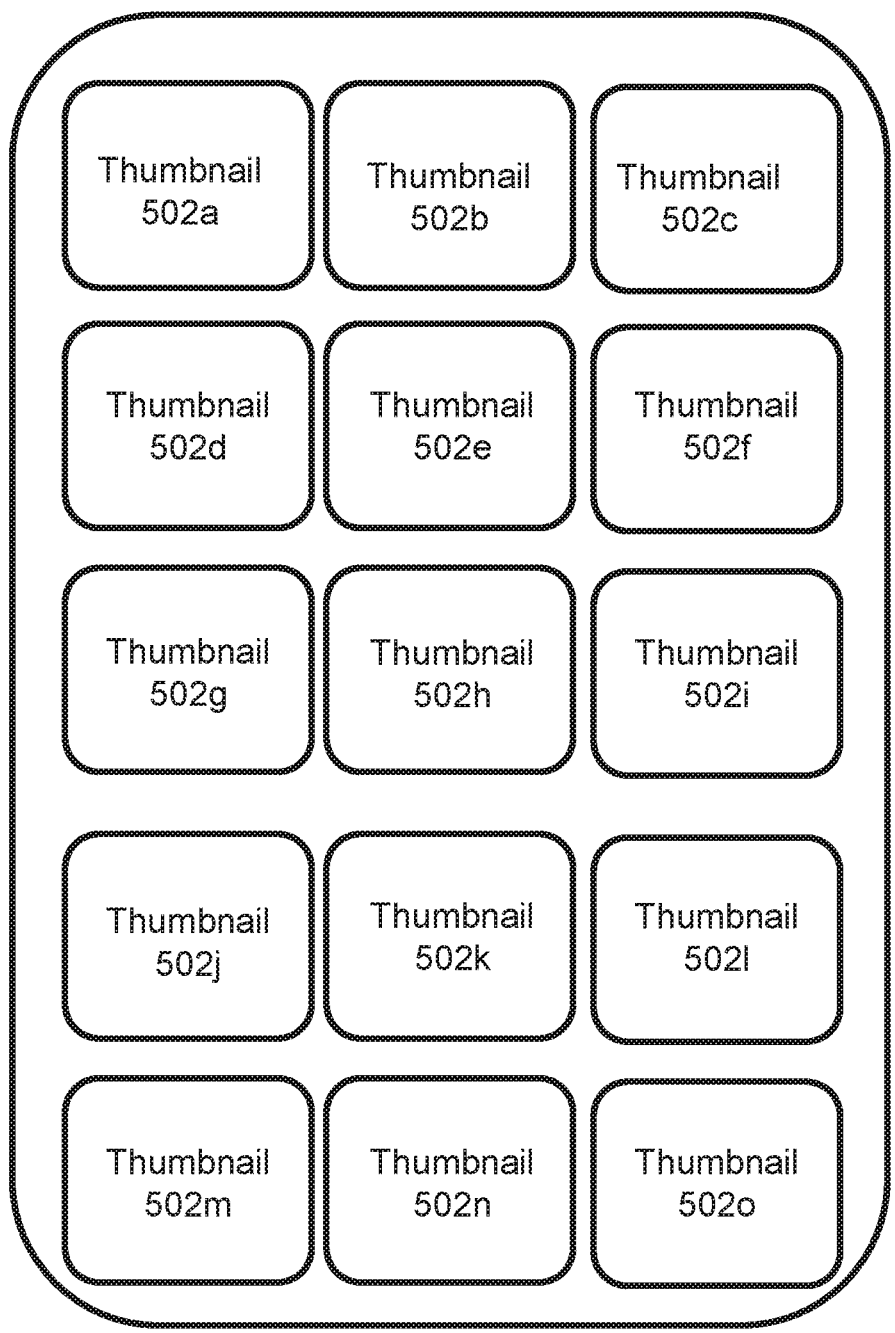
FIGS. 5a-b illustrate exemplary graphical user interfaces of high priority content item folders.
Figure 5B:
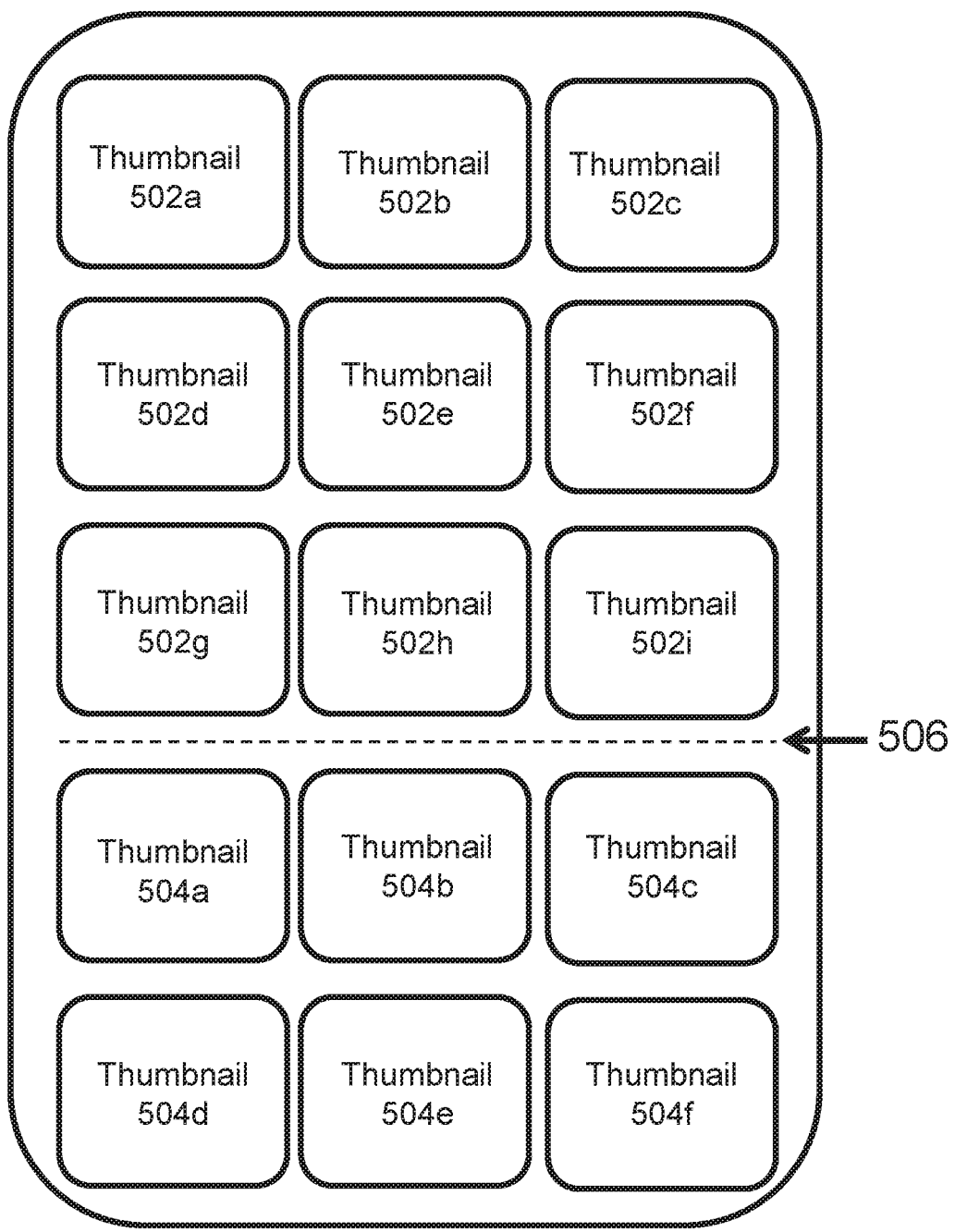

FIGS. 5a-b illustrate exemplary graphical user interfaces ("GUIs") of high priority content item folders. The priority content module 15 can also include other GUIs that are not illustrated. The user, e.g., a wireless subscriber, of the wireless device 10 can select to view a folder of only the high priority content items as illustrated in FIG. 5a. For example, if the content items are photographs, the high priority image folder 500 includes a first number (e.g., fifteen) of thumbnails 502 of high priority images ordered according to their total priority score. If there are more than the first number of high priority content items, thumbnails 502 of the other higher priority content items can be viewed by scrolling down the high priority image folder 500. The high priority thumbnails 502 can be the thumbnails 302 and/or be created from the image data 304.

Alternatively, the user of the wireless device 10 can select to view a folder including the content items that are both high priority and lower priority, as illustrated in FIG. 5b. For example, if the content items are photographs, the high priority image folder 501 includes a second number (e.g., nine) of thumbnails 502 of high priority images ordered according to their total priority score and a third number (e.g., six) thumbnails 504 of lower priority images ordered chronologically. The high priority thumbnails 502 can be the thumbnails 302 and/or be created from the image data 304. In some implementations, a visual indicator 506 can indicate the end of the high priority content items in the high priority image folder 501.

Moreover, one or more other objects that are not illustrated can be added to the GUIs 500-501. For example, an advertisement or company banner can be illustrated in the GUIs 500-501. In addition, although thumbnails 502 and 504 are illustrated according to a particular layout in the GUIs 500-501, the layout of the thumbnails 502 and 504 can be changed to any other layout. Finally, although the thumbnails 502 and 504 are shown having particular shapes and sizes, the size and/or shape of thumbnails 502 and 504 can be changed.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a," "an," and "the" include plural referents unless the content clearly indicates otherwise. Thus, for example, reference to "a wireless device 10" includes two or more wireless devices.

Reference to "one implementation," "some implementations," "other implementations," or "one or more implementations" means that a particular feature, structure, or characteristic described in connection with the implementation is included in at least one implementation but not necessarily in the same implementation or separate implementations that are mutually exclusive. Moreover, various features may be exhibited by some implementations and not by other implementations. Similarly, various requirements are described that may be requirements for some implementations but not other implementations.

A number of implementations have been described. Nevertheless, it will be understood that various modifications may be made without departing from the spirit and scope of the claims. The wireless device 10 may operate using any mobile operating system. The internally stored rules of operation of the wireless device 10, including the priority content module 15, may be changed together with other wireless devices via a broadcast message received from a wireless operator, such as a mobile virtual network operator ("MVNO"). The MVNO is a wireless operator that typically does not own its own frequency spectrum or have its own network infrastructure. Instead, MVNOs contract for the right to access a wireless communications network owned by a mobile network operator ("MNO") and sell that access to their wireless subscribers.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method for automatically ordering display of high priority content items on a wireless device, comprising:
identifying with a wireless device processor two or more content items locally stored on a wireless device, wherein the content items are photographs;
determining with the wireless device processor a first priority metric for each of the two or more content items, the first priority metric being a number of times that a user of the wireless device accesses each of the two or more content items;
determining with the wireless device processor a second priority metric for each of the two or more content items, the second priority metric being different from the first priority metric;
multiplying with the wireless device processor the first priority metric by a first weight to calculate a first priority score for each of the two or more content items;
multiplying with the wireless device processor the second priority metric by a second weight to calculate a second priority score for each of the two or more content items, the second weight being different from the first weight;
summing with the wireless device processor the first priority score and the second priority score to calculate a total priority score for each of the two or more content items;
comparing with the wireless device processor the total priority score for each of the two or more content items to a predetermined threshold to identify high priority content items within the two or more content items;

generating a prioritized display presentation with the wireless device processor, for displaying on a display of the wireless device, the high priority content items in order of the total priority scores; and displaying on the display of the wireless device the high priority content items in order of the total priority scores based on the prioritized display presentation generated with the wireless device processor, wherein the second priority metric is at least one of the following: a metric measuring an access characteristic of each of the two or more content items by the user of the wireless device, a metric determined based on metadata included in each of the two or more content items, or a metric determined based on analysis of data of each of the two or more content items;

wherein the second priority metric is a metric determined based on the access characteristic of each of the two or more content items; and wherein the access characteristic of each of the two or more content items by the user of the wireless device is at least one of the following: a measure of total access time of each content item, a type of manipulation of each access of each content item, or a type of transfer of each content item.

2. The method of claim 1, wherein the wireless device is a wireless device capable of connecting to a wireless communication network.

3. The method of claim 1, further comprising grouping the high priority content items in a high priority folder locally stored on the wireless device.

4. The method of claim 1, wherein the second priority metric is the metric measuring an access characteristic of each of the two or more content items by the user of the wireless device.

5. The method of claim 4, wherein the analysis of each of the two or more content items is at least one of the following: a number of faces in each content item, whether a person of interest is included in each content item, whether each content item is in focus, brightness of each content item, or a most frequent color of each content item.

6. The method of claim 1, wherein the second priority metric is the metric determined based on metadata included in each of the two or more content items.

7. The method of claim 6, wherein the metadata included in each of the two or more content items is at least one of the following: an orientation of each content item, a resolution of each content item, a date and time of capture of each content item, or a Global Positioning System position of capture of each content item.

8. The method of claim 1, further comprising:

determining a third priority metric for each of the two or more content items, the third priority metric being different from the first priority metric and the second priority metric; and multiplying the third priority metric by a third weight to calculate a third priority score for each of the two or more content items, the third weight being different from the first weight and the second weight, wherein summing the first priority score and the second priority score to calculate the total priority score for each of the two or more content items comprises summing the first priority score, the second priority score, and the third priority score to calculate the total priority score for each of the two or more content items.

9. The method of claim 1, wherein a value of the first weight and the second weight change over time.

10. The method of claim 1, wherein a value of the predetermined threshold changes over time.

11. The method of claim 1, wherein the two or more content items include content items of two or more types.

12. The method of claim 1, wherein the two or more content items include content items of a same type.

13. The method of claim 1, wherein the high priority content items are selected from the group consisting of file names of the high priority content items, thumbnails of the high priority content items, and information extracted from metadata included in the high priority content items.

14. The method of claim 1, wherein:

comparing the total priority score for each of the two or more content items to the predetermined threshold to identify the high priority content items within the two or more content items comprises determining that the total priority score for the high priority content items is above the predetermined threshold; and configuring presentation of the identifiers of the high priority content items in order of the total priority score comprises configuring presentation, in response to determination that the total priority score for the high priority content items is above the predetermined threshold, of the identifiers of the high priority content items in order of the total priority score.

15. A wireless device comprising at least one wireless device processor connected to at least one memory, wherein the at least one wireless device processor is configured to:

identify with at least one wireless device processor two or more content items locally stored on a wireless device, wherein the two or more content items are photographs captured by a camera implemented by the wireless device;

determine with the at least one wireless device processor a first priority metric for each of the two or more content items, the first priority metric being a number of times that a user of the wireless device accesses each of the two or more content items;

determine with the at least one wireless device processor a second priority metric for each of the two or more content items, the second priority metric being different from the first priority metric;

multiply with the at least one wireless device processor the first priority metric by a first weight to calculate a first priority score for each of the two or more content items;

multiply with the at least one wireless device processor the second priority metric by a second weight to calculate a second priority score for each of the two or more content items, the second weight being different from the first weight;

sum with the at least one wireless device processor the first priority score and the second priority score to calculate a total priority score for each of the two or more content items;

compare with the at least one wireless device processor the total priority score for each of the two or more content items to a predetermined threshold to identify high priority content items within the two or more content items;

generate a prioritized display with the at least one wireless device processor presentation, for display on a display of the wireless device, the high priority content items in order of the total priority score; and display on the display of the wireless device the high priority content items in order of the total priority scores based on the prioritized display presentation generated with the wireless device processor, wherein the second priority metric is at least one of the following: a metric measuring an access characteristic of each of the two or more content items by the user of the wireless device, a metric determined based on metadata included in each of the two or more content items, or a metric determined based on analysis of data of each of the two or more content items;

wherein the second priority metric is a metric determined based on the access characteristic of each of the two or more content items; and wherein the access characteristic of each of the two or more content items by the user of the wireless device is at least one of the following: a measure of total access time of each content item, a type of manipulation of each access of each content item, or a type of transfer of each content item.

16. A non-transitory computer readable medium storing a computer program, the computer program comprising one or more code segments that, when executed, cause at least one wireless device processor of a wireless device to:

identify with at least one wireless device processor two or more content items locally stored on a wireless device, wherein the two or more content items are photographs captured by a camera implemented by the wireless device;

determine with the at least one wireless device processor a first priority metric for each of the two or more content items, the first priority metric being a number of times that a user of the wireless device accesses each of the two or more content items;

determine with the at least one wireless device processor a second priority metric for each of the two or more content items, the second priority metric being different from the first priority metric;

multiply with the at least one wireless device processor the first priority metric by a first weight to calculate a first priority score for each of the two or more content items;

multiply with the at least one wireless device processor the second priority metric by a second weight to calculate a second priority score for each of the two or more content items, the second weight being different from the first weight;

sum with the at least one wireless device processor the first priority score and the second priority score to calculate a total priority score for each of the two or more content items;

compare with the at least one wireless device processor the total priority score for each of the two or more content items to a predetermined threshold to identify high priority content items within the two or more content items;

generate a prioritized display with the at least one wireless device processor presentation, for display on a display of the wireless device, of the high priority content items in order of the total priority score; and display on the display of the wireless device the high priority content items in order of the total priority scores based on the prioritized display presentation generated with the wireless device processor, wherein the second priority metric is at least one of the following: a metric measuring an access characteristic of each of the two or more content items by the user of the wireless device, a metric determined based on metadata included in each of the two or more content items, or a metric determined based on analysis of data of each of the two or more content items;

wherein the second priority metric is a metric determined based on the access characteristic of each of the two or more content items; and wherein the access characteristic of each of the two or more content items by the user of the wireless device is at least one of the following: a measure of total access time of each content item, a type of manipulation of each access of each content item, or a type of transfer of each content item.

17. The non-transitory computer readable medium of claim 16, wherein the wireless device is a wireless device capable of connecting to a wireless communication network.

18. The non-transitory computer readable medium of claim 16, further comprising grouping the high priority content items in a high priority folder locally stored on the wireless device.

19. The non-transitory computer readable medium of claim 16, wherein the second priority metric is the metric measuring an access characteristic of each of the two or more content items by the user of the wireless device.

20. The non-transitory computer readable medium of claim 16, wherein the second priority metric is the metric determined based on metadata included in each of the two or more content items.

* * * * *